//

United States Patent [19]
Kurosawa

[11] Patent Number: 4,475,105
[45] Date of Patent: Oct. 2, 1984

[54] SYSTEM FOR DETECTING MECHANICAL MOVEMENT
[75] Inventor: Ryoichi Kurosawa, Hachioji, Japan
[73] Assignee: Tokyo Shibaura Denki Kabushiki Kaisha, Kawasaki, Japan
[21] Appl. No.: 535,289
[22] Filed: Sep. 23, 1983
[30] Foreign Application Priority Data
Sep. 24, 1982 [JP] Japan .................. 57-165018
[51] Int. Cl.³ .............................................. G05B 1/02
[52] U.S. Cl. ............................ 340/870.25; 318/608; 324/167
[58] Field of Search ............. 318/606, 607, 608, 654; 324/160, 167; 340/870.25, 870.32, 870.34

[56] References Cited
U.S. PATENT DOCUMENTS

| | | | |
|---|---|---|---|
| 3,261,007 | 7/1966 | Frisch | 340/870.25 |
| 3,634,838 | 1/1972 | Grangyist | 340/870.25 |
| 4,023,085 | 5/1977 | Bishop et al. | 318/608 |
| 4,109,189 | 8/1978 | Jacques | 318/608 |
| 4,243,921 | 1/1981 | Tamura | 318/608 |
| 4,282,468 | 8/1981 | Barker | 318/608 |
| 4,310,790 | 1/1982 | Mulet-Marquis | 318/608 |
| 4,358,722 | 11/1982 | Iwakane | 318/654 |

OTHER PUBLICATIONS
"12 and 14 Bit Hybrid Synchro/Resolver to Digital Converters" Analog Devices 1982 Data Book, vol. 1.

Primary Examiner—James J. Groody
Assistant Examiner—Michael F. Heim
Attorney, Agent, or Firm—Schwartz, Jeffery, Schwaab, Mack, Blumenthal & Koch

[57] ABSTRACT

A system for detecting mechanical movement of a body under detection comprises: a synchro generator having multiple-phase primary windings and a secondary winding, either of the primary windings or the secondary winding capable of being coupled to the body, and a phase-shifting circuit phase-shifting the secondary induced signal by 90°. A phase comparator determines the phase difference between a set of two-phase reference sinusoidal signals and a second set of two-phase signals consisting of the induced signal and the phase-shifted signal. A frequency-divider counts pulses of a frequency proportional to the phase difference and produces a digital signal indicative of the count value at each moment. An exciting circuit for exciting the synchro generator determines the instantaneous values of the exciting voltage in accordance with the count value of the frequency divider. The synchro generator, the phase-shifting circuit, the phase comparator, the frequency-divider and the exciting circuit form a phase-locked-loop controlling the induced voltage so as to be in phase with the reference signals. A digital signal relating to the movement is produced in accordance with a signal from the phase-locked-loop.

15 Claims, 11 Drawing Figures

F I G. 1
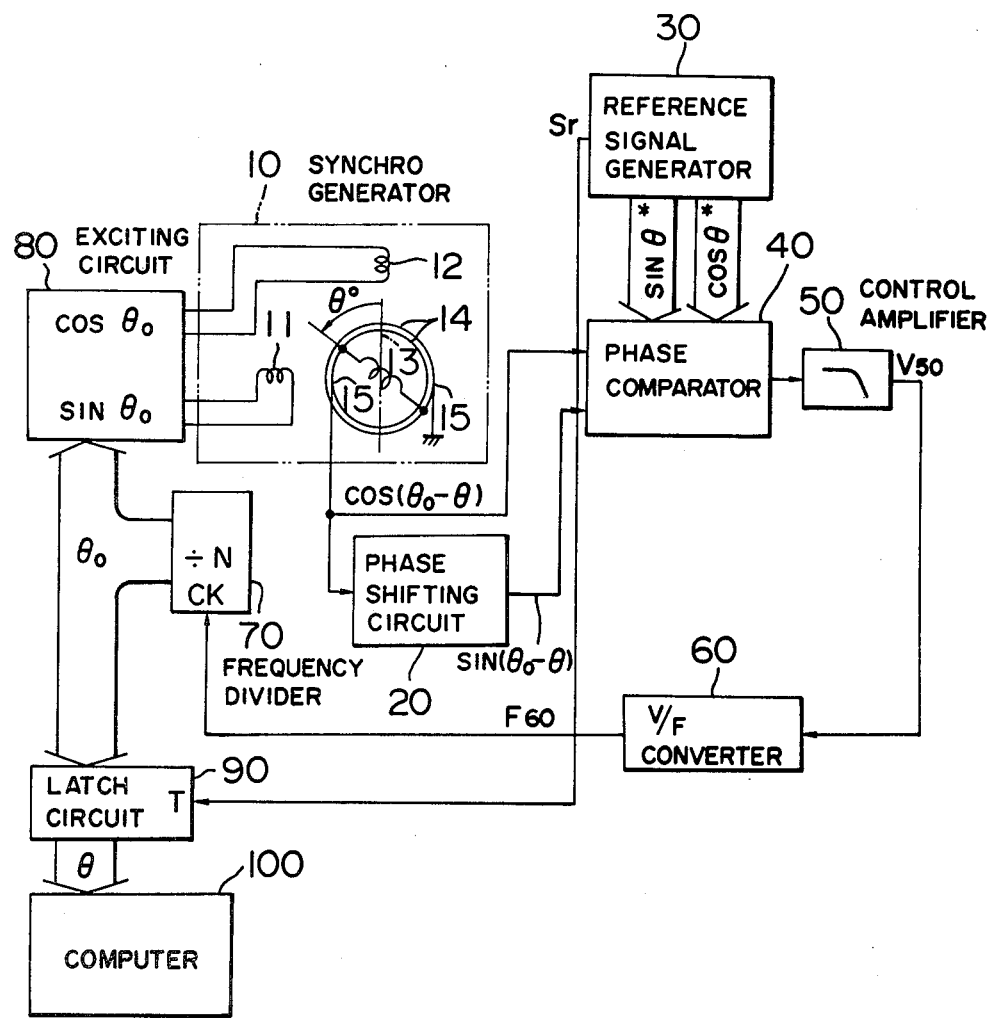

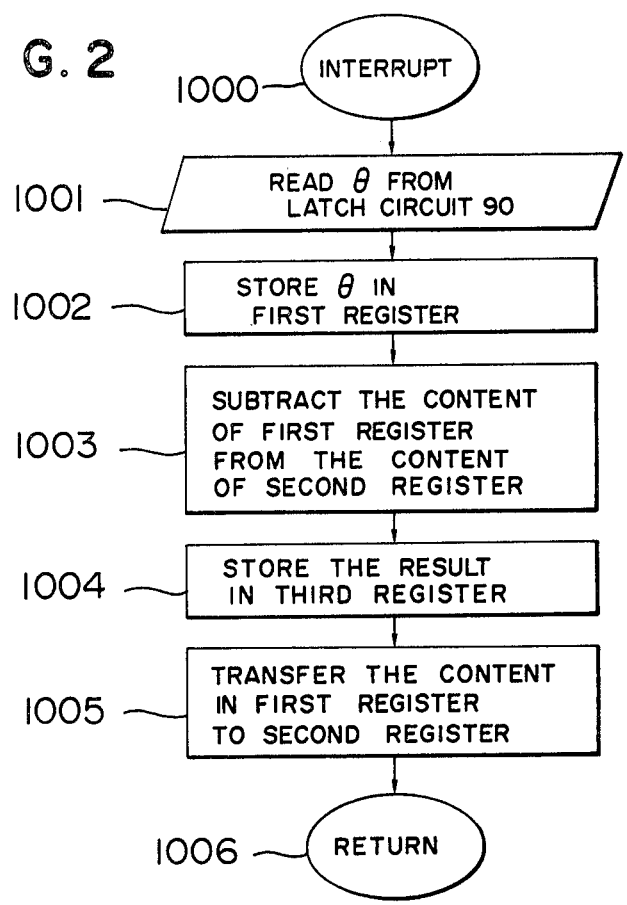
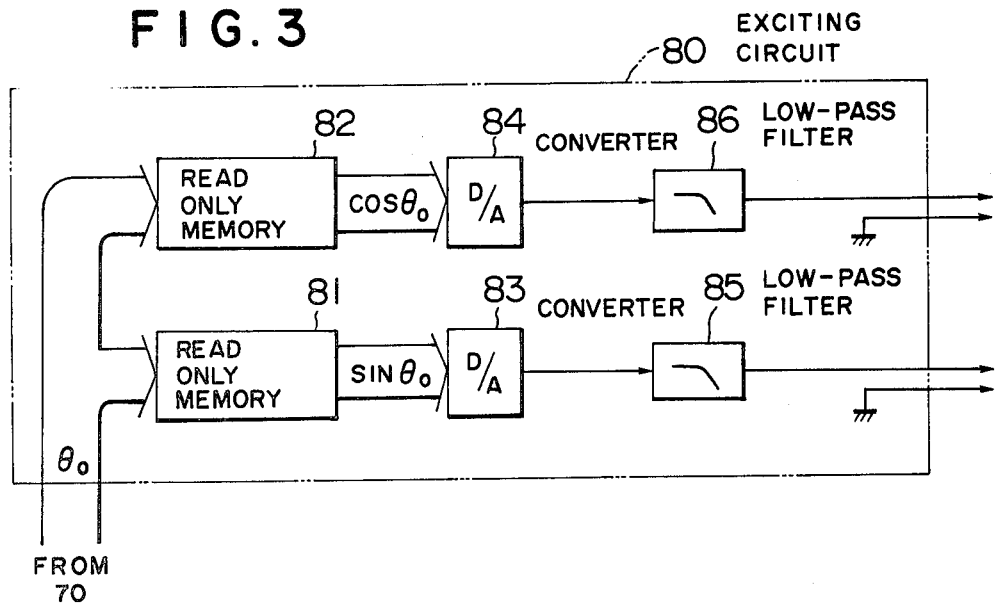

CK INPUT

D INPUT

Q OUTPUT 1 sec.

SYSTEM FOR DETECTING MECHANICAL MOVEMENT

BACKGROUND OF THE INVENTION

This invention relates to a digital system for detecting mechanical movement of a body under detection to produce a digital signal indicative of the position or the speed of the body or to produce pulses in synchronism with the movement.

In the past, a tachometer generator having the same construction as a DC generator was used for detecting the rotational speed of a rotating body. Position of a rotating body was detected by means of a potentiometer coupled to the shaft of the body. Detection of the speed or the position of linear movement of a body was achieved by converting the linear movement into rotation by means of gears or the like, and by detecting the rotation in a similar manner.

The signals indicative of the speed and the position thus detected are often used as feedback signals. When the feedback control system is composed of analog circuits, the analog signals from the tachometer generator are convenient.

However, in recent years, control systems often comprise digital circuits including microcomputers, use of which makes it possible to improve accuracy and stability of control. In addition, a digital system has a smaller number of devices which require adjustment and use of a microcomputer reduces the cost of the system.

When a digital control system is used, a feedback signal must be in the form of a digital signal. One way of providing a digital signal is to convert an analog feedback signal into a digital signal by means of an analog-to-digital converter. But, the original analog signal is less accurate and less stable, so that advantages of using a digital system are reduced. Moreover, tachometer generators and potentiometers are associated with mechanically sliding parts, which require frequent inspection and maintenance, which are troublesome and costly.

In another conventional speed detection system, a rotary pulse generator or a frequency generator generating an output of a frequency proportional to the rotational speed is used. The number of pulses generated is counted and a digital signal indicative of the detected speed is produced. This system has a disadvantage in that detection with high accuracy cannot be achieved unless the number of pulses generated during one revolution is very large. For instance, when the rotational speed of 960 rpm (=16 rps) is to be detected at a sampling period of 10 m sec. and with a resolution of 12 bits, i.e., about 0.025% ($=2^{-12}$), a pulse generator producing 25,600 pulses per revolution is required. This means the output of the pulse generator is more than 400 KHz when the detected speed is 960 rpm, and transmitting a pulse signal of such a high frequency from the pulse generator to a control device is not easy. Moreover, such a pulse generator will have very delicate construction, and is therefore difficult to handle, and is costly.

SUMMARY OF THE INVENTION

An object of the invention is to provide a system for detecting mechanical movement of a body under detection and producing a digital signal indicative of the position, the speed or the like, which is simple in construction, and compact, which has a quick response and a high resolution in detection and in which transmission and processing of the signal are easy.

The foregoing object and other objects of the invention have been achieved by the provision of a system for detecting mechanical movement of a body under detection comprising: a synchro generator having multiple-phase primary windings and a secondary winding, either of the primary windings or the secondary winding capable of being coupled to said body; an exciting circuit for providing multiple-phase, sinusoidal exciting voltages to said primary windings; said secondary winding inducing a sinusoidal signal when said primary windings are excited; a reference signal generator for providing a first set of two-phase, reference sinusoidal signals of a predetermined frequency; a phase-shifting circuit receiving the signal induced in said secondary winding and producing a phase-shifted signal having a phase 90° different from the induced signal; a phase comparator for comparing the first set of the two-phase reference sinusoidal signals and a second set of two-phase signals consisting of the induced signal and the phase-shifted signal and producing a phase difference signal indicative of the phase difference between the two sets of signals; first means responsive to the phase difference signal for producing pulses at a frequency corresponding to the phase difference; a frequency-divider counting said pulses and producing a first digital signal indicative of the count value at each moment; said exciting circuit being responsive to the first digital signal from the frequency-divider for determining the instantaneous values of the exciting voltages at each moment; said synchro generator, said reference signal generator, said phase-shifting circuit, said phase comparator, said frequency-divider and said exciting circuit forming a phase-locked-loop controlling the induced voltage so as to be in phase with the reference signals; and second means responsive to the phase-locked-loop for producing a second digital signal relating to the movement of said body under detection.

BRIEF DESCRIPTION OF THE DRAWINGS

In the accompanying drawings:

FIG. 1 is a block diagram showing an embodiment of the invention;

FIG. 2 is a flow chart showing the operation of the computer 100 shown in FIG. 1;

FIG. 3 is a block diagram showing the internal construction of an example of the exciting circuit 80 shown in FIG. 1;

DETAILED DESCRIPTION OF THE PREFERRED EMBODIMENTS

Figure 4:
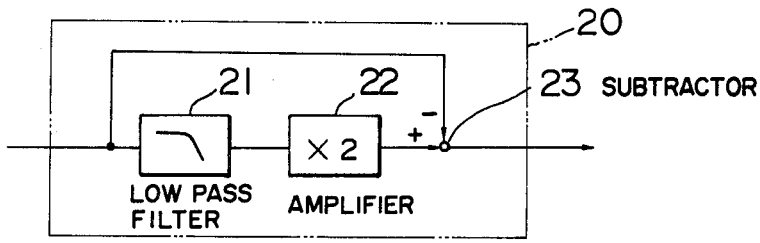
FIG. 4 is a block diagram showing the internal construction of an example of the phase-shifting circuit 20 shown in FIG. 1.

Referring now more particularly to FIG. 1, there is shown an embodiment of the invention, in which a numeral 10 denotes an inductive type rotary detector or a synchro generator having two poles, which includes a stator and a rotor movable relative to each other. The rotor is capable of being coupled to a body under detection. Two-phase primary windings 11 and 12 are mounted on the stator. A single-phase secondary winding 13 is mounted on the rotor. Slip rings 14 and brushes 15 in contact with the slip rings 14 serve to connect the winding 13 to an external circuitry, which will be described later, and, in operation, voltage Vi induced in the winding 13 is transmitted to the external circuitry. The induced voltage Vi is sinusoidal when the primary windings 11 and 12 are excited by sinusoidal currents. As will be explained later, the exciting voltages supplied to the primary windings have phases represented by cos $\theta_0$ and sin $\theta_0$. Assume that the rotary position of the rotor winding 13 with reference to the stator windings 11 and 12 is represented by an angle $\theta$. Then the phase of the induced voltage Vi is represented by cos $(\theta_0-\theta)$.

The circuit external to the synchro generator 10 includes a phase shifting circuit 20 which receives and shifts, e.g., retards the phase of the voltage Vi by 90° to obtain a signal having a phase sin $(\theta_0-\theta)$.

A reference signal generator 30 generates two-phase reference sinusoidal signals 90° apart from each other and of a predetermined constant frequency. The phases of the reference sinusoidal signals from the reference signal generator 30 are represented by cos $\theta^*$ and sin $\theta^*$. In addition, the reference signal generator 30 provides a reference timing signal which is a periodical square wave in synchronism with the reference sinusoidal signals and its trailing edges coincide with the phase angle zero ($\theta^*=0$) of the reference sinusoidal signals.

A phase comparator 40 receives the two-phase signals consisting of the induced voltage Vi and the phase-shifted signal from the phase shifting circuit 20, and the two-phase signals from the reference signal generator 30 and produces a phase difference signal sin $[\theta^*-(\theta_0-\theta)]$ indicative of the phase difference between the two sets of two-phase inputted signals.

A control amplifier 50 receives the output of the phase comparator 40 and produces a voltage signal $V_{50}$ corresponding thereto. Besides providing a control action, e.g., a proportional plus integral control action, the control amplifier 50 has a function of a low-pass filter removing the AC components thereby to obtain a DC voltage whose value is increased when the phase difference is positive and is decreased when the phase difference is negative, and is kept unchanged when the phase difference is zero.

A voltage-to-frequency converter (hereinafter referred to as a V/F converter) 60 receives the output of the control amplifier 50 and produces pulses at a frequency $F_{60}$ proportional to the output of the control amplifier 50.

A frequency divider 70 counts the output pulses of the converter 60, and produces the count value in the form of a digital signal indicative of the electric phase angle $\theta_0$. The digital signal is therefore of a value which changes at a rate proportional to the output voltage of the control amplifier 50, and which, when it reaches a value corresponding to 360°, returns to zero.

An exciting circuit 80 receives the count value $\theta_0$ from the frequency divider 70 and produces two signals having instantaneous values proportional to sin $\theta_0$ and cos $\theta_0$. The successions of these two signals form, as far as the rate of the change of $\theta_0$ is substantially constant, substantially sinusoidal waveforms of 90° apart from each other, i.e., E sin $\theta_0$ and E cos $\theta_0$, with E being a constant and $\theta_0$ varying. The outputs E sin $\theta_0$ and E cos $\theta_0$ of the exciting circuit 80 are applied to the primary windings 11 and 12, respectivley.

The synchro generator 10 and the circuits 20, 30, 40, 50, 60, 70 and 80 form a phase locked loop (PLL) which compares the phases of two sets of signals and serves to keep a in-phase relationship between the two sets of signals. By the function of the PLL, the output $\theta_0$ of the frequency divider 70 is so controlled that the induced voltage $(\theta_0-\theta)$ is kept in phase with the reference signals $\theta^*$.

More specifically, the output of the phase comparator 40 is, as was described above, indicative of sin $[\theta^*-(\theta_0-\theta)]$ which is linearly related to $[\theta^*-(\theta_0-\theta)]$ as far as $[\theta^*-(\theta_0-\theta)]$ is small, and direction (polarity) of change of sin $[\theta^*-(\theta_0-\theta)]$ is identical to that of change of $[\theta^*-(\theta_0-\theta)]$ as far as the magnitude of $[\theta^*-(\theta_0-\theta)]$ does not exceed 90°. As a result, control to approach sin $[\theta^*-(\theta_0-\theta)]$ to zero amounts to control to approach $[\theta^*-(\theta_0-\theta)]$ to zero. As long as the in-phase relationship is maintained, the output level of the control amplifier 50 is kept unchanged, the output frequency $F_{60}$ of the V/F converter 60 is kept unchanged, and the rate of change of $\theta_0$ outputted by the frequency divider 70, i.e., the frequency of the exciting voltages is kept unchanged. When the induced voltage $(\theta_0-\theta)$ lags to result in a positive value of the phase difference signal sin $[\theta^*-(\theta_0-\theta)]$, then the output level of the control amplifier 50 is increased, the output frequency $F_{60}$ of the V/F converter 60 is increased, and the rate of change of $\theta_0$ outputted by the frequency divider 70, i.e., the frequency of the exciting voltages are increased, so that the induced voltage $(\theta_0-\theta)$ is advanced to catch up with the reference signals $\theta^*$. When the induced voltage $(\theta_0-\theta)$ leads, then the output frequency of the V/F converter 60 is decreased and the frequency of the exciting voltages is decreased, so that the induced voltage $(\theta_0-\theta)$ is retarded to be in line with the reference signals $\theta^*$.

As has been described, the PLL serves to maintain the following relationship.

$$\theta_0-\theta=\theta^*$$

hence, $$\theta=\theta_0-\theta^*$$

$\theta_0$ and $\theta^*$ are the angles of the outputs of the frequency divider 70 and the reference signal generator. Accordingly, if signals indicative of the values $\theta_0$ and $\theta^*$ are obtained, the value of $\theta$ which represents the rotary position can be determined by subtracting $\theta^*$ from $\theta_0$.

Alternatively, if a timing pulse is produced when either of $\theta_0$ and $\theta^*$ is at a specific value, say $T_0$ or $T^*$, and a signal indicative of the value of the other of $\theta_0$ and $\theta^*$ is obtained, then the value of $\theta$ can be determined either by subtracting $T^*$ from $\theta_0$, or $\theta^*$ from $T_0$. If such a timing pulse is produced when either of $\theta_0$ and $\theta^*$ is 0 (zero), the value of $\theta$ is equal to $\theta_0$ or $-\theta^*$.

In the embodiment of FIG. 1, the value of $\theta_0$ at the moment of $\theta^*=0$ is read and used as the value indicative of $\theta$. To materialize this concept, a latch circuit 90 is provided, which receives the reference timing signal Sr from the reference signal generator 30, and reads and stores the count value $\theta_0$ from the frequency divider 70 when the trailing edge of the reference timing signal Sr appears, i.e., when $\theta^* = 0$. The output of the latch circuit 90 is indicative of the value of $\theta$, i.e., the position of the body under detection, at the last previous occurrence of the trailing edge of the reference timing signal Sr, and changes each time the trailing edge appears, i.e., every cycle of the reference signal.

A computer, such as a microcomputer 100 reads the values stored in the latch circuit 90. It also performs the arithmetic operations to determine the speed of the body under detection and to control the position or the speed of the body under detection.

The speed of the body can be determined in accordance with the difference between readings at two separate instants divided by the time length between the two separate instants. This can be done by taking the difference between the successive readings of the latch circuit 90 since the length of the period of one cycle of the reference signal Sr is constant.

The procedure for determining the speed is shown in FIG. 2. The trailing edge of the reference timing signal Sr is used for initiating interrupt (step 1000). Then, the value $\theta$ stored in the latch circuit 90 is read and stored in a first register, not shown, (1001, 1002). The value stored in the first register is subtracted from the value stored in a second register, not shown, which is the value read out of the latch circuit 90 in the last previous cycle (1003). The result, i.e., the difference obtained is indicative of the speed, and is stored in a third register, not shown, for further use or processing (1004). Then, the value in the first register is transferred into the second register (1005). This concludes the interrupt program, and return to the main program is effected (1006).

For further description of the embodiment of FIG. 1, it is assumed, for instance, the maximum rotational speed is 1920 rpm. Assume, also, that the desired resolution in detection of position is 15 bits, i.e., $2^{-15} \times 360°$ ($\approx 0.003\% \times 360°$). In this case, the output of the frequency divider 70 comprises a counter of 15 bits. In other words, the dividing factor $N_{70}$ of the frequency divider is $2^{15} = 32,768$.

Since the PLL serves to maintain the relationship:

$$\theta_0 - \theta = \theta^*,$$

$$\frac{d}{dt}(\theta_0 - \theta) = \frac{d}{dt}\theta^*$$

$$\therefore \frac{d}{dt}\theta_0 - \frac{d}{dt}\theta = \frac{d}{dt}\theta^*$$

i.e., $\omega_0 - \omega = \omega^*$ where $\omega_0$, $\omega$, $\omega^*$ are angular frequencies, and $\omega_0 = d/dt\theta_0$, $\omega = d/dt\theta$, $\omega^* = d/dt\theta^*$.
Hence, $$f_0 - f = f^*$$

where $f_0$, $f$, $f^*$ are frequencies and $f_0 = 1/2\pi\omega_0$, $f = 1/2\pi\omega$, $f^* = 1/2\pi\omega^*$.

The frequency f may take a value in the range between $-f_{max}$ and $f_{max}$, $f_{max}$ being the maximum frequency corresponding to the maximum rotational speed, in one or forward direction, of the body under detection, that is $f_{max} = 1920$ rpm/$60 = 32$ Hz.

The frequency $f_0$ of the exciting currents may take a value over the range between ($f^* - f_{max}$) and ($f^* + f_{max}$). The frequency $f^*$ of the reference signal is selected, for instance to be 128 Hz so that $f_0 = f^* - f$ be always positive and, moreover, the range of variation of $f_0$ with respect to the center frequency $f^*$ is relatively small.

The maximum frequency $f_{0max}$ of the exciting currents is $f^* + f_{max} = 128 + 32 = 160$ Hz. Since the dividing factor $N_{70}$ of the frequency divider 70 is 32,768, the V/F converter 60 needs to be capable of producing an output up to about 5.3 MHz ($\approx 160 \times 32,768$).

The latch circuit 90 is selected to be one having 15 bits, the same as the frequency divider 70.

With the arrangement described above, the detection of the position $\theta_0$ of the body under detection is made every sampling period of 7.8 m sec., and the detected value has a resolution of $2^{-15} \times 360°$.

The detection of the rotational speed is also made every sampling period of 7.8 m sec. The number of bits of the detected value of the speed depends on the speed. If the speed is 960 rpm ($=16$ rps), there occurs $\frac{1}{8}$ ($=2^{-3}$) rotation over the sampling period of 7.8 m sec., so that the detected value is given as a value of 12 bits.

FIG. 3 shows in detail an example of the exciting circuit 80, which comprises a pair of read only memories (ROM's) 81, 82 which receive, as an address, the high order 8 bits among the 15 bits of the signal $\theta_0$ from the frequency divider 70. The memory 81 stores, at the 256 ($=2^8$) addresses whose values are identical to the high order 8 bits of $\theta_0$, the values of $\sin\theta_0$. The memory 82 stores, at the 256 ($=2^8$) addresses whose values are identical to the high order 8 bits of $\theta_0$, the values of $\cos\theta_0$. When the high order 8 bits of $\theta_0$ are inputted as the address to the memories 81, 82, the contents of the address are outputted in the form of digital signals indicative of $\sin\theta_0$ and $\cos\theta_0$. The successions of the digital signals $\sin\theta_0$ and $\cos\theta_0$ respectively form sine and cosine waveforms, i.e., two phase sinusoidal waves.

Digital-analog converters (hereinafter referred to as D/A converters) 83, 84 receive the digital signals and convert them into analog signals with 256 steps in each cycle. Low-pass filters 85, 86 receive the analog signals from the D/A converters 83, 84 and remove the stepping changes from the waveforms to produce continuously varying sinusoidal waveforms.

It will be appreciated that the use of the low-pass filters 85, 86 makes it unnecessary to use all of the 15 bits of $\theta_0$ in determining $\sin\theta_0$ and $\cos\theta_0$, but requires only the 8 bits. As a result, the ROM's 81, 82 need to have only 256 ($=2^8$) addresses or bytes, instead of $2^{15}$ of them which would be required if all of the 15 bits were used.

FIG. 4 shows in detail an example of the phase-shifting circuit 20. This is a circuit known per se and called an all-pass filter circuit. It comprises a low pass filter 21, an amplifier 22 and a subtractor 23. If the cut-off frequency of the low pass filter 21 is selected to be the input sinusoidal wave frequency, the output will be a sinusoidal wave lagging behind the input by 45°, with the amplitude being $1/\sqrt{2}$. The amplitude of the output is doubled by the amplifier 22. The subtractor 23 determines the difference between the output of the amplifier 22 and the input to the phase-shifting circuit 20:

$$2 \times 1/\sqrt{2} \cos(\theta_0 - \theta - \pi/4) - \cos(\theta_0 - \theta) = \sin(\theta_0 - \theta)$$

Thus, the result, i.e., the output of the subtractor 23 has a phase represented by $\sin(\theta_0 - \theta)$, that is retarded by 90° with reference to the input $\cos(\theta_0 - \theta)$.

Figure 5:
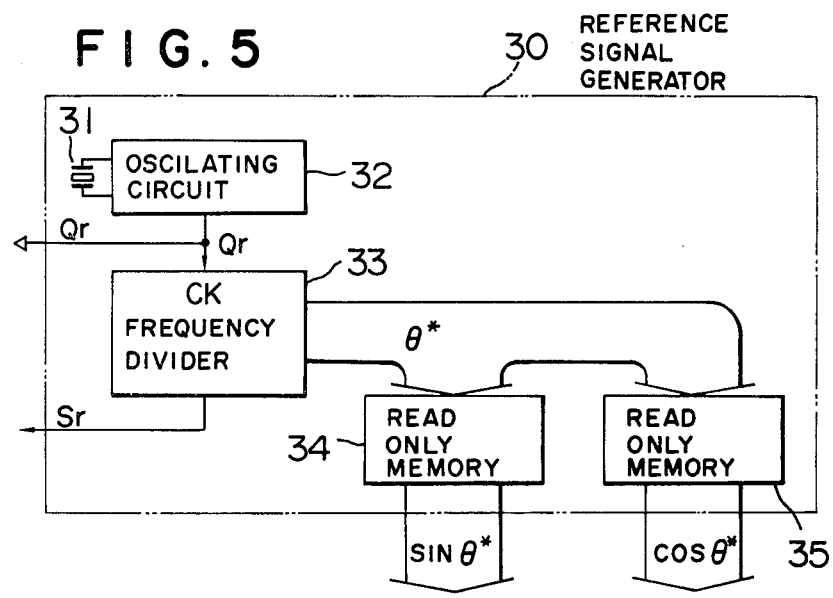
FIG. 5 is a block diagram showing the internal construction of an example of the reference signal generator 30 shown in FIG. 1.

FIG. 5 shows in detail an example of the reference signal generator 30. As illustrated, the reference signal generator 30 comprises a crystal oscillator 31, an oscillating circuit 32 cooperating with the crystal oscillator 31 for producing a signal of a frequency of, say $2^{22}$ Hz (=4,194,304 Hz), and a frequency divider 33 comprising a counter of 15 bits which receives the output of the oscillating circuit 32 and frequency-divides it by the dividing factor of $2^{15}$ (=32,768) to produce a reference timing signal Sr of 128 Hz. Use of the crystal oscillator 31 is advantageous in that the resultant oscillation is stable and the oscillating frequency is accurate.

The frequency divider 33 also provides the count value $\theta^*$ of 15 bits. The reference signal generator 30 further comprises a pair of read only memories (ROM's) 34, 35 which receive, as an address, the high order 8 bits among the 15 bits of the signal $\theta_0$ from the frequency divider 33. The memory 34 stores, at the 256 (=$2^8$) addresses whose values are identical to the high order 8 bits of $\theta_0$, the values of sin $\theta_0$. The memory 35 stores, at the 256 (=$2^8$) addresses whose values are equal to the high order 8 bits of $\theta_0$, the values of cos $\theta_0$. When the high order 8 bits of $\theta_0$ are inputted as the address to the memories 34, 35, the contents of the address are outputted in the form of digital signals indicative of sin $\theta_0$ and cos $\theta_0$. The successions of the digital signals sin $\theta_0$ and cos $\theta_0$ respectively form sine and cosine waveforms, i.e., two phase sinusoidal waves.

Figure 6:
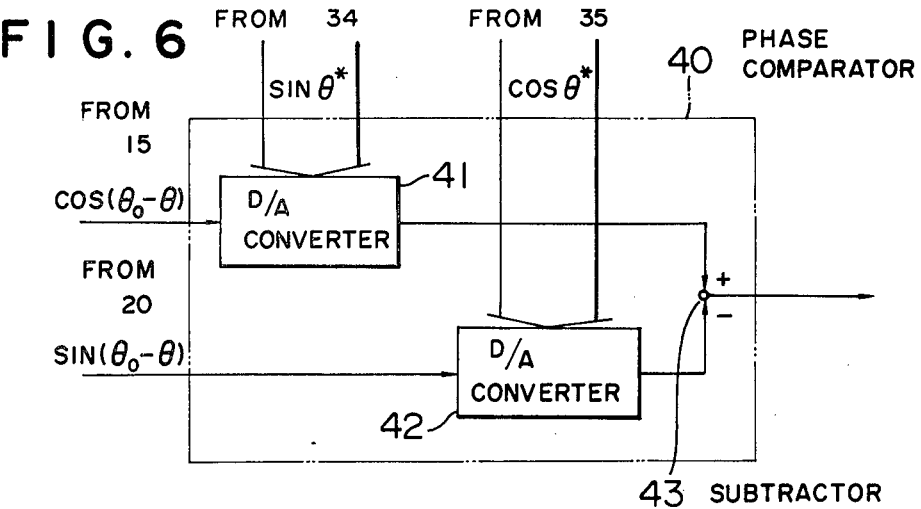
FIG. 6 is a block diagram showing the internal construction of an example of the phase comparator 40 shown in FIG. 1.

FIG. 6 shows in detail an example of the phase comparator 40 which comprises multiplying digital-to-analog (D/A) converters 41 and 42, each of which has a function of multiplying the analog input signal by a digital input signal. An example of commercially available converter having such a function is an integrated circuit AD7523 supplied by Analog Devices, Inc. U.S.A. Supplied as the digital input signals to the converters 41 and 42 are those indicative of sin $\theta^*$ and cos $\theta^*$ from the reference signal generator 30. Supplied as the analog input signals are those indicative of cos $(\theta_0-\theta)$ and sin $(\theta_0-\theta)$ from the winding 13 and the phase-shifting circuit 20. The outputs of the converters 41 and 42 are analog signals indicative of the products:

$$\sin \theta^* \times \cos (\theta_0-\theta), \text{ and}$$

$$\cos \theta^* \times \sin (\theta_0-\theta),$$

respectively. A subtractor 43 subtracts the output of the converter 42 from the output of the converter 43, i.e., to perform the operation:

$$\sin \theta^* \times \cos (\theta_0-\theta) - \cos \theta^* \times \sin (\theta_0-\theta)$$

to obtain $$\sin [\theta^* - (\theta_0-\theta)].$$

Thus an analog signal indicative of the difference between $\theta^*$ and $(\theta_0-\theta)$ is obtained.

Figure 7:
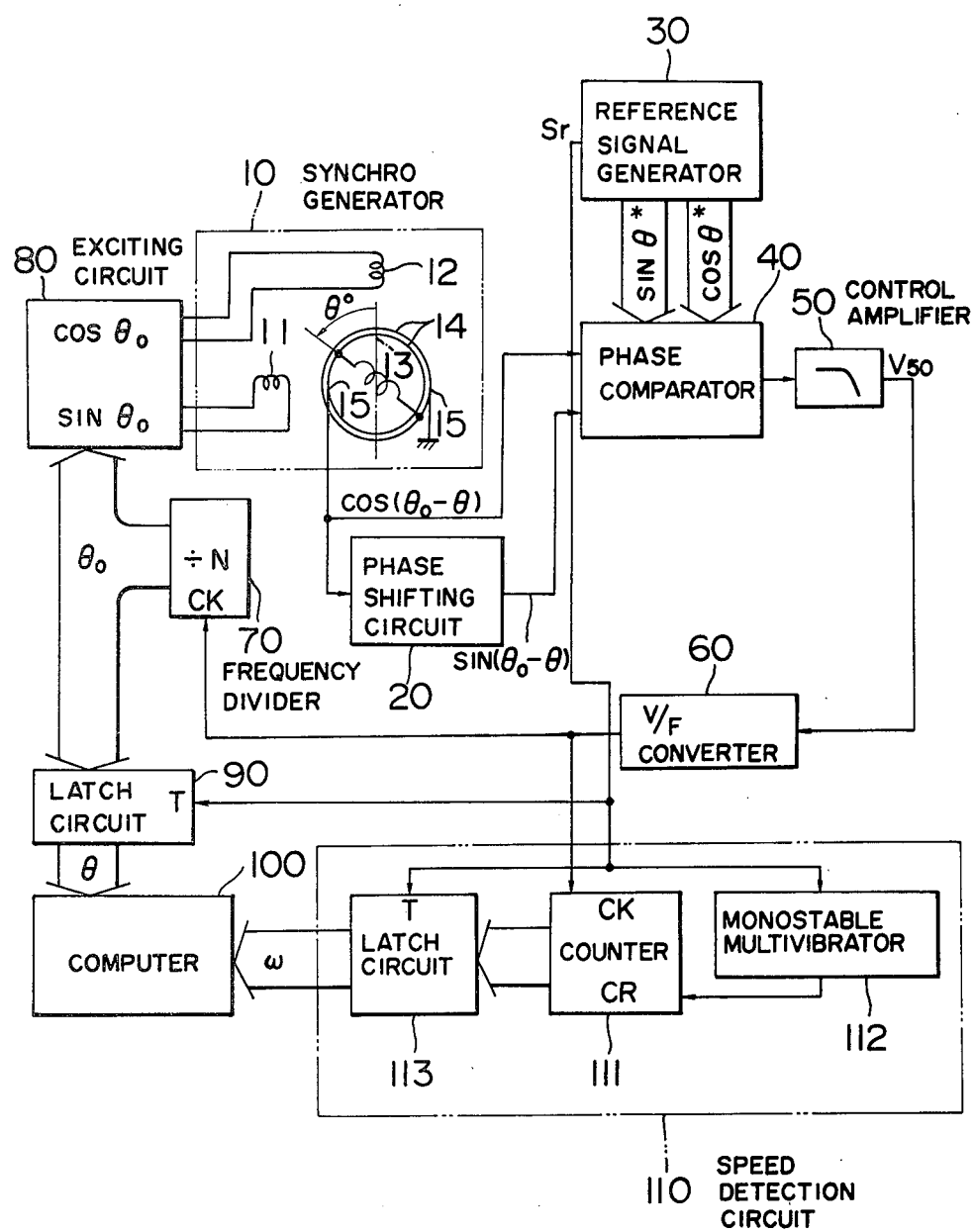
FIGS. 7 and 8 are block diagrams showing other embodiments of the invention.

FIG. 7 shows another embodiment of the invention. The reference numerals identical to those in FIG. 1 denote identical or similar components. As will be seen, a speed detection circuit 110 is added, which comprises a counter 111 of 15 bits which receives and counts the output pulses from the V/F converter 60. A monostable multivibrator 112 receives the reference timing signal Sr, and upon the occurrence of the trailing edge of the signal Sr, it is triggered into a quasi-stable state and returns to the original stable state after a short delay time. This delay time is shorter than one cycle of the output (when it is of the highest frequency) of the V/F converter 60. The counter 111 receives at the clear terminal CR the output of the monostable multivibrator 112, and when the monostable multivibrator 112 returns to the original stable state the counter 111 is cleared. A latch circuit 113 receives the output of the counter 111. It also receives, at the timing terminal T, the reference timing signal Sr. When the trailing edge of the signal Sr occurs, the latch circuit 113 stores the count value of the counter 111. Immediately thereafter, i.e., upon the elapse of the delay time, the monostable multivibrator 112 returns to the stable state and the counter 111 is thereby cleared.

It is assumed that the frequency of the signal Sr is 128 Hz and the output of the frequency divider 70 is 15 bits. For the speeds 0, 960, −960 rpm (hence 0, 16, −16 rps), the frequency of the output of the V/F converter 60 is 4,194,304 (=$2^{15} \times 128$) Hz, 4,718,592 (=$2^{15} \times (128+16)$) Hz, 3,670,016 (=$2^{15} \times (128-16)$) Hz, respectively. The number of pulses outputted from the V/F converter 60 and inputted into the counter 111 during the sampling period of 7.8 m sec. (=1/128 sec.) is 32,768; 36,864; 28,672, respectively. The counter 111 is of 15 bits and therefore overflows at the 32,768-th pulse. Accordingly, at the end of the sampling period, the count value of the counter 111 is 0 (32,768−32,768), 4,096 (36,864−32,768), 28,672. These values are stored by the latch circuit 113 and is in turn further processed in the computer 100.

As is usual, the digital values within the range of zero to half the full scale are treated as positive values and the digital values within the range of the maximum to the half value are treated as negative values with the magnitude being equal to the difference between the maximum value and the digital value in question. Accordingly, the obtained value 4,096 is treated as positive 4,096, and the obtained value 28,672 is treated as negative 4,096 (=32,768−28,672).

As has been explained, the embodiment described above, provides digital values indicative of the speed, so that the computer 100 need not perform arithmetic operation to determine the speed, so that software load can be reduced.

Figure 8:
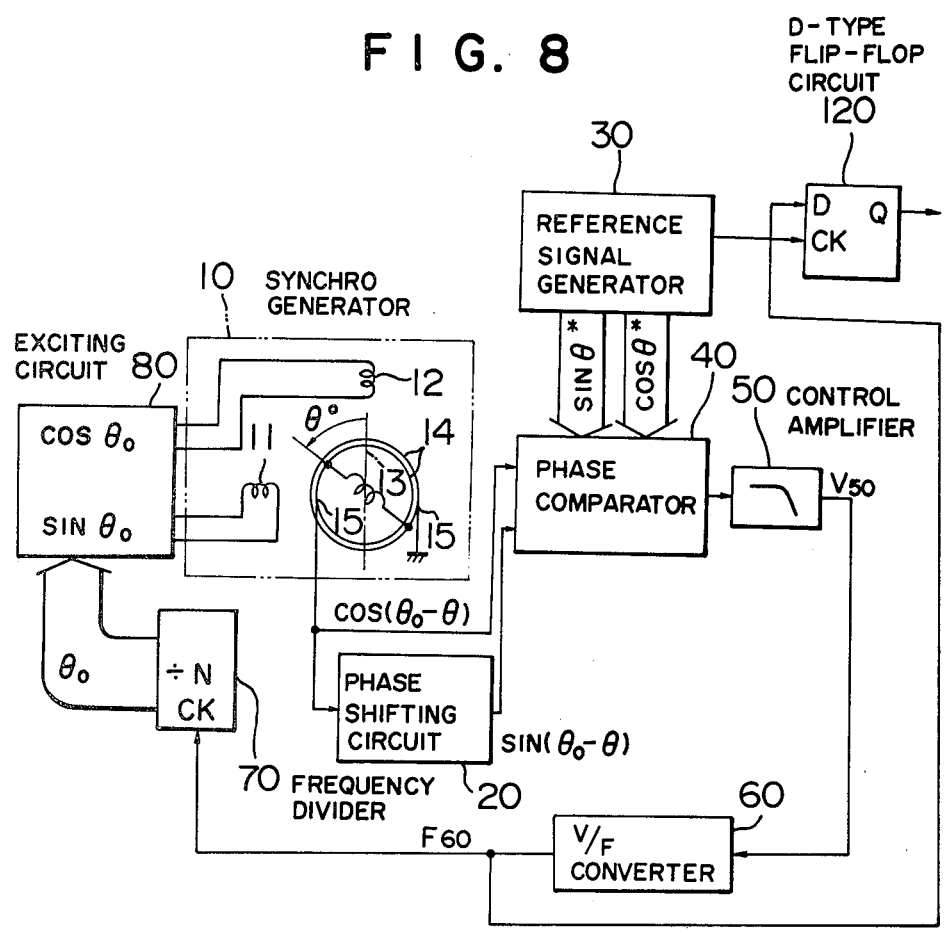

FIG. 8 shows another embodiment of the invention for providing pulses in synchronism with the rotation of the body under detection. The reference numerals identical to those in FIG. 1 denote identical or similar components.

A pulse comparator 120 is added, which comprises a D-type flip-flop circuit which receives, at the clock terminal CK, the output pulses Qr from the oscillating circuit 32 within the reference signal generator 30 having the internal construction of FIG. 5, and receives, at the data terminal D, the output pulses from the V/F converter 60.

Figure 9A:
FIG. 9 is a time chart showing the operation of the D-type flip-flop circuit 120 shown in FIG. 8.
Figure 9B:
Figure 9C:

When receiving pulses of different frequencies at the terminals CK and D, the D-type flip-flop circuit 120 operates, in a manner as illustrated in FIG. 9, to produce pulses of the difference frequency at the output terminal Q.

In FIG. 9, it is assumed, for the sake of simplicity, that pulses of 10 Hz are applied to the terminal CK and pulses of 8 Hz are applied to the terminal D. In this case, as will be understood from FIG. 9, the pulses of 2 Hz appear at the output terminal Q.

The output of the oscillating circuit 32 is of a frequency $32,768 \times f^*$. The output of the V/F converter 60 is of a frequency $32,768 \times f_0$. Accordingly, the output of the flip-flop circuit 120 is of a frequency $32,768 \times (f_0 - f^*)$. As explained previously, $f_0 - f^* = f$, hence the output of the flip-flop circuit 120 is of a frequency 32,768×f, in other words, pulses of a frequency which is 32,768 times the frequency f corresponding to the rotational speed of the body under detection are produced. Thus, the arrangement is obtained which is equivalent to a rotary pulse generator producing 32,768 pulses per revolution, and can therefore be utilized for movement detection at a high resolution.

In the embodiments described, the slip rings and brushes are used to connect the windings on the rotor with a circuit external to the synchro generator. But, a rotary transformer may be used in place.

In the embodiments described above, the primary windings are provided on the stator and the secondary winding is provided on the rotor. But, alternatively, the primary windings may be provided on the rotor and the secondary winding may be provided on the stator.

In the embodiments described, the pole pair number of the synchro generator is 1. But, a synchro generator having m (m>1) pairs of poles may alternatively be used. In this case, mechanical rotational angle $\theta$ is reflected to electrical angle of $m\theta$, so that the detection resolution becomes 1/m.

The invention is also applicable where a linear-type synchro generator, rather than the rotary-type synchro generator as described, is used to detect the position and the speed of linear movement.

As has been described, according to the invention, the phase comparator 40 receives sinusoidal waveform signals, so that the AC components contained in the output of the phase comparator 40 are those due to stepping changes of the digital values sin $\theta^*$ and cos $\theta^*$. Accordingly, the AC components are at relatively high frequencies, so that the cut-off frequency of the control amplifier 50 can be made higher and the arrangement for low-pass filter operation is made simpler, but elimination of the AC components is ensured. As a result, there will be less fluctuation in the frequency of the V/F converter 60, the detection response time becomes shorter, and the detection accuracy is improved.

Moreover, a phase shifting circuit is used to provide a phase-shifted signal, so that the synchro generator itself need not provide two phase signals. Accordingly, a synchro generator with a single-phase secondary winding which is simple in construction can be employed. This significantly reduces the size and cost of the total system.

What is claimed is:

1. A system for detecting mechanical movement of a body under detection comprising:
 a synchro generator having multiple-phase primary windings and a secondary winding, either of the primary windings or the secondary winding capable of being coupled to said body,
 an exciting circuit for providing multiple-phase, sinusoidal exciting voltages to said primary windings,
 said secondary winding inducing a sinusoidal signal when said primary windings are excited,
 a reference signal generator for providing a first set of two-phase, reference sinusoidal signals of a predetermined frequency,
 a phase-shifting circuit receiving the signal induced in said secondary winding and producing a phase-shifted signal having a phase 90° different from the induced signal,
 a phase comparator for comparing the first set of the two-phase reference sinusoidal signals and a second set of two-phase signals consisting of the induced signal and the phase-shifted signal and producing a phase difference signal indicative of the phase difference between the two sets of signals,
 first means responsive to the phase difference signal for producing pulses at a frequency corresponding to the phase difference,
 a frequency-divider counting said pulses and producing a first digital signal indicative of the count value at each moment,
 said exciting circuit being responsive to the first digital signal from the frequency-divider for determining the instantaneous values of the exciting voltages at each moment,
 said synchro generator, said reference signal generator, said phase-shifting circuit, said phase comparator, said frequency-divider and said exciting circuit forming a phase-locked-loop controlling the induced voltage so as to be in phase with the reference signals, and
 second means responsive to the phase-locked-loop for producing a second digital signal relating to the movement of said body under detection.

2. A system as set forth in claim 1, wherein the frequency of the pulses produced by said first means is kept unchanged as long as the induced signal is in phase with the reference sinusoidal signal, the frequency of said pulses is decreased as the induced signal advances in phase, and the frequency of said pulses is increased as the induced signal retards in phase.

3. A system as set forth in claim 1, wherein said exciting circuit comprises memory means receiving, as an address, the count value from said frequency-divider and producing, as said instantaneous values, the contents stored at the address, the succession of the contents thus produced forming sinusoidal signals.

4. A system as set forth in claim 1, wherein said second means comprises means responsive to the reference signal generator and the frequency-divider for determining the difference between the phase angles of the outputs thereof, said difference being indicative of the position of the body under detection and said second digital signal being indicative of said difference.

5. A system as set forth in claim 4, wherein said reference signal generator further provide a reference timing signal in synchronism with said reference sinusoidal signals, and said second means comprises a latch circuit receiving the count value from the frequency-divider and the reference timing signal, and storing the count value when the reference sinusoidal signal is at a predetermined phase angle, said second digital signal being indicative of the count value stored in said latch circuit.

6. A system as set forth in claim 1, wherein said reference signal generator further provides a reference timing signal in synchronism with said reference sinusoidal signals, and said second means receives the reference timing signal and the pulses from said first means and produces a digital signal indicative of the speed of the body under detection.

7. A system as set forth in claim 6, wherein said second means comprises a counter counting the pulses from said first means, a latch circuit receiving the count value from the counter and the reference timing signal, and storing the count value when the reference sinusoidal signal is at a predetermined phase angle, and means receiving the reference timing signal and clearing the counter immediately after the count value is stored by the latch circuit.

8. A system as set forth in claim 1, wherein said reference signal generator comprises means generating clock pulses at a predetermined frequency, and a frequency-divider counting the clock pulses and producing a frequency-divided signal, said frequency-divided signal being used as said reference timing signal.

9. A system as set forth in claim 8, wherein said second means is responsive to the clock pulses from the reference signal generator and the pulses from said first means for producing pulses at a frequency equal to the difference between the frequencies of the clock pulses and the pulses from said first means.

10. A system as set forth in claim 9, wherein said second means comprises a D-type flip-flop circuit receiving the clock pulses and the pulses from said first means at the clock pulse input terminal and at the data input terminal, and producing said pulses at the difference frequency.

11. A system as set forth in claim 1, wherein said phase comparator produces an analog signal indicative of the phase difference between the two sets of signals, and said first means comprises a voltage-to-frequency converter for producing pulses at a frequency which changes depending on said analog signal.

12. A system as set forth in claim 11, wherein said first means further comprises a control amplifier which receives said analog signal and has proportional plus integral gain, said voltage-to-frequency converter receiving the output of said control amplifier.

13. A system as set forth in claim 1, wherein:
said reference signal generator produces two-phase sinusoidal signals having a phase sin $\theta^*$ and cos $\theta^*$ respectively, and
said phase comparator comprises a first multiplier for multiplying the induced signal having the phase cos $(\theta_0 - \theta)$ and one of the first set of signals having the phase sin $\theta^*$ to produce a signal related to sin $\theta^* \times \cos(\theta_0 - \theta)$, a second multiplier for multiplying the phased-shifted signal having the phase sin $(\theta_0 - \theta)$ and the other of the first set of signals having the phase cos $\theta^*$ to produce a signal related to cos $\theta^* \times \sin(\theta_0 - \theta)$, and means responsive to the output signals from the first and second multipliers for producing an analog signal related to the difference:

$$\sin \theta^* \times \cos(\theta_0 - \theta) - \cos \theta^* \times \sin(\theta_0 - \theta) = \sin[\theta^* - (\theta_0 - \theta)]$$

which analog signal is used as the output of said phase comparator.

14. A system as set forth in claim 13, wherein:
said reference signal generator comprises means generating clock pulses at a predetermined frequency, a frequency-divider counting the clock pulses and producing a digital signal indicative of the count value at each moment, first memory means receiving the count value as the address and producing the content stored at the address, and second memory means receiving the count value as the address and producing the content stored at the address, the successions of the contents produced by said first and second memory means forming two-phase sinusoidal signals.

15. A system as set forth in claim 14, wherein:
each of said multipliers comprises a multiplying digital-to-analog converter receiving at an analog input terminal one of the second set of the signals and at a digital input terminal one of the first set of signals and producing an analog signal related to the product of the inputted analog and digital signals.

* * * * *